(12) United States Patent  
Yamamoto et al.

(10) Patent No.: US 9,056,576 B2  
(45) Date of Patent: Jun. 16, 2015

(54) UTILITY VEHICLE

(71) Applicant: KAWASAKI JUKOGYO KABUSHIKI KAISHA, Hyogo (JP)

(72) Inventors: Teruaki Yamamoto, Kakogawa (JP); Itsuo Takegami, Kobe (JP); Yoshiyuki Kuroyanagi, Akashi (JP)

(73) Assignee: KAWASAKI JUKOGYO KABUSHIKI KAISHA, Hyogo (JP)

( * ) Notice: Subject to any disclaimer, the term of this patent is extended or adjusted under 35 U.S.C. 154(b) by 0 days.

(21) Appl. No.: 13/729,693

(22) Filed: Dec. 28, 2012

(65) Prior Publication Data

US 2014/0183894 A1 Jul. 3, 2014

(51) Int. Cl.
*B60P 3/42* (2006.01)
*B62D 33/02* (2006.01)
*B62D 23/00* (2006.01)

(52) U.S. Cl.
CPC ............... *B60P 3/423* (2013.01); *B62D 33/02* (2013.01); *B62D 23/005* (2013.01)

(58) Field of Classification Search
CPC ........ B60P 3/423; B62D 33/02; B62D 23/005
USPC ............. 296/24.43, 26.01, 26.08, 183.1
See application file for complete search history.

(56) References Cited

U.S. PATENT DOCUMENTS

| | | | |
|---|---|---|---|
| 6,626,478 B1* | 9/2003 | Minton | 296/26.11 |
| 6,676,182 B2* | 1/2004 | Fitts | 296/26.11 |
| 6,905,159 B1 | 6/2005 | Saito et al. | |
| 6,994,388 B2 | 2/2006 | Saito et al. | |
| 7,249,798 B2 | 7/2007 | Saito et al. | |
| 8,136,857 B2* | 3/2012 | Shimizu et al. | 296/26.09 |
| 8,328,262 B2* | 12/2012 | Kawabata et al. | 296/24.43 |

* cited by examiner

*Primary Examiner* — Glenn Dayoan
*Assistant Examiner* — Melissa A Black
(74) *Attorney, Agent, or Firm* — Wenderoth, Lind & Ponack, L.L.P.

(57) ABSTRACT

A utility vehicle includes a front seat, a rear seat at a rear side of the front seat, and a cargo bed at a rear side of the rear seat, and a screen for partitioning the cargo bed and a riding space at a front side of the cargo bed. The cargo bed includes left and right fixed side walls, a front wall movable into the riding space, and left and right expansion side walls expandable into the riding space. The cargo bed is changeable between an expanded state in which the cargo bed is expanded forward into the riding space and a non-expanded state in which the cargo bed is not expanded into the riding space. The screen is attached to the front wall, and each expansion side wall is foldably attached to the front wall and a corresponding one of the fixed side walls.

20 Claims, 16 Drawing Sheets

UTILITY VEHICLE

BACKGROUND OF THE INVENTION

1. Field of the Invention

The present invention relates to a utility vehicle in which a cargo bed can be expanded forward so as to utilize an area or a capacity of a cargo bed space and a riding space to a maximum extent according to needs of a user.

2. Description of the Related Art

The present applicant filed applications of inventions relating to a utility vehicle having a cargo bed in which an area or a capacity can be expanded, and those applications have already been registered. For example, the inventions include U.S. Pat. No. 6,905,159, U.S. Pat. No. 6,994,388, and U.S. Pat. No. 7,249,798.

In utility vehicles shown in the above documents, a front seat and a rear seat are arranged in a riding space covered by a ROPS (Roll Over Protection Structure), and a cargo bed is arranged behind the rear seat. By changing the rear seat from a use state to a stowed state, a front part of the cargo bed can be expanded into the riding space which is occupied by the rear seat in the use state.

In the above utility vehicles, a screen is provided in a front end of the cargo bed so that a cargo loaded on the cargo bed is not moved into the riding space on the front side of the cargo bed. There is a need for changing a position of this screen between a two-seater specification in which the cargo bed is expanded forward and a four-seater specification in which the cargo bed is not expanded.

FIG. 19 shows one example of an expandable cargo bed shown in the above documents. A cargo bed 400 is provided with a fixed bottom plate 401, left and right fixed side walls 402, a pair of left and right expansion side walls 404 supported pivotably on hinge shafts 403 which are provided in front ends of the fixed side walls 402, an expansion bottom plate 405 provided in a front end of the fixed bottom plate 401, and a front wall 406. A screen 407 is integrated with the front wall 406.

Positioning and fixing pins 410 protruding downward are provided in both left and right ends of the screen 407. Pin insertion holes 411, 412 into which the pins 410 of the screen 407 are insertable are respectively formed on upper surfaces of tip ends of the expansion side walls 404 and on upper surfaces of the front ends of the fixed side walls 402.

As shown by solid lines in FIG. 19, when the expansion side walls 404 are closed (in the four-seater specification), the screen 407 is placed in the front ends of both the fixed side walls 402, and the pins 410 of the screen 407 are inserted into the pin insertion holes 412 of the fixed side walls 402 from the upper side. Meanwhile, as shown by imaginary lines, when the expansion side walls 404 are opened forward (at the time of two-seater specification), the screen 407 is placed in front ends of both the expansion side walls 404, and the pins 410 of the screen 407 are inserted into the pin insertion holes 411 of the expansion side walls 404 from the upper side.

With the above configuration, in a case where the screen 407 is moved between an expansion position at the time of expansion of the cargo bed 400 and a non-expansion position at the time of non-expansion of the cargo bed 400, firstly, the screen 407 has to be brought up together with the front wall 406 in order to take out the left and right pins 410 from the pin insertion holes 411 or 412. Then, there is a need for integrally moving the screen 407 and the front wall 406 rearward or forward, and after moving, inserting the pins 410 into the pin insertion holes 412 or 411 from the upper side.

However, the screen 407 integrally having the front wall 406 is heavy and width of the screen 407 ranges over the substantially entire lateral width of the cargo bed 400. Thus, moving the screen 407 by one person is highly troublesome and difficult. Therefore, currently, there is a need for two operators to hold and bring up left and right ends of the screen 407 and the front wall 406 so as to take out the pins 410, and after moving, insert the pins into the pin insertion holes 411 or 412 again. Thus, movement of the screen 407 is troublesome.

SUMMARY OF THE INVENTION

An object of the present invention is to provide a utility vehicle in which a movement task of a screen in accordance with expansion and contraction tasks of a cargo bed is simplified and even one operator can easily and promptly perform the above task.

A utility vehicle includes a front seat, a rear seat, and a cargo bed provided in order from the front side, and includes a screen for partitioning the cargo bed and a riding space on the front side of the cargo bed, wherein the cargo bed includes left and right fixed side walls, a front wall movable into the riding space, and left and right expansion side walls expandable into the riding space, the cargo bed is changeable between an expanded state in which the cargo bed is expanded forward into the riding space and a non-expanded state in which the cargo bed is not expanded in the riding space, the screen is attached to the front wall, and the expansion side walls are foldably attached to the front wall and the fixed side walls.

According to the above configuration, by extending or folding the expansion side walls in a task of expanding or contracting the cargo bed, a position of the screen can be easily changed between an expansion position and a non-expansion position without bringing up the screen.

The present invention preferably further includes the following configurations.

(1) The expansion side wall is coupled to the front wall and the fixed side wall via hinges and formed in such a manner that even numbers of plate members are coupled to each other via a hinge.

(2) A locking mechanism for locking at least one of angles including an open angle made by the front wall and the plate member taking the hinge as a vertex, an open angle made by the plate member and the fixed side wall taking the hinge as a vertex, and an open angle made by the plate members taking the hinge as a vertex to be predetermined angles in the expanded state and the non-expanded state is provided.

(3) The plate members are coupled to each other by an elastic member so as to be biased in such a manner that the open angle is a predetermined open angle.

(4) A plurality of rollers is provided in a lower end of the front wall.

(5) Lock devices for fixing the front wall to a vehicle body at a position in the expanded state and at a position in the non-expanded state are provided on the left and right sides of the front wall, and the lock devices are displaceable between a fixing position where the lock devices are placed on the outer side in the vehicle width direction of the cargo bed for fixing the front wall and a non-fixing position where the lock devices are placed on the inner side in the vehicle width direction of the cargo bed.

(6) In the above configuration (5), hooks to be engaged with the lock devices in the expanded state and the non-expanded state are respectively provided in the vehicle body, and the hooks are placed on the outer side in the vehicle width direction of the expansion side walls in the expanded state and the non-expanded state.

(7) In the above configuration (5), the lock devices are placed on the outer side in the vehicle width direction of the expansion side walls at the fixing position in the expanded state and the non-expanded state.

(8) In the above configuration (1), a fixing member for fixing the plate members is provided.

According to the above configuration (1), a configuration of the foldable expansion side walls can be readily achieved.

According to the above configuration (2), the plate members can be fixed in the expanded state and the non-expanded state.

According to the above configuration (3), the folded expansion side wall is biased in the direction in which the expansion side wall is extended so as to have the predetermined angle by the elastic member. Thus, the expansion side wall can be readily displaced from a folded state to an extended state.

According to the above configuration (4), the front wall can be readily moved forward and rearward. Since the front wall is readily moved forward and rearward, the expansion side walls can be readily extended or folded.

According to the above configuration (5), at the time of moving the front wall forward and rearward, contact between side ROPS's provided in side ends of the vehicle body and the lock devices can be prevented by placing the lock devices at the non-fixing position. At the time of fixing the front wall, the front wall can be readily fixed to the side ends of the vehicle body by placing the lock devices at the fixing position.

According to the above configuration (6), displacement of the expansion side walls to the outer side in the vehicle width direction can be suppressed by the hooks.

According to the above configuration (7), the displacement of the expansion side walls to the outer side in the vehicle width direction can be suppressed by the lock devices.

According to the above configuration (8), the plate members can be fixed so as not to be displaced.

In sum, according to the present invention, the utility vehicle in which the movement task of the screen in accordance with the expansion and contraction tasks of the cargo bed is simplified and even one operator can easily and promptly perform the above task can be provided.

DETAILED DESCRIPTION OF THE INVENTION

Figure 1:
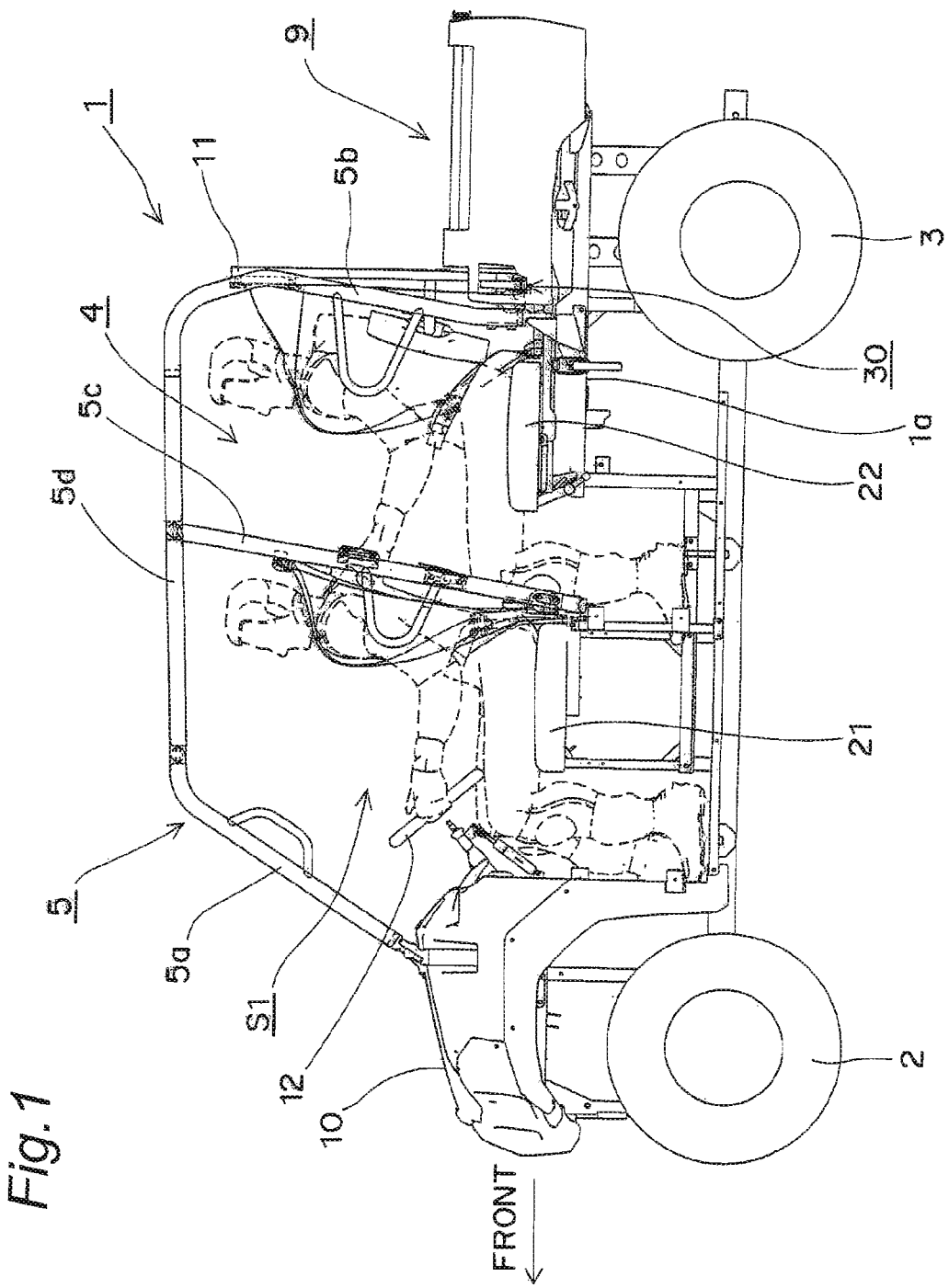
FIG. 1 is a left side view of a utility vehicle according to the present invention in which a cargo bed is in a non-expanded state.
Figure 2:
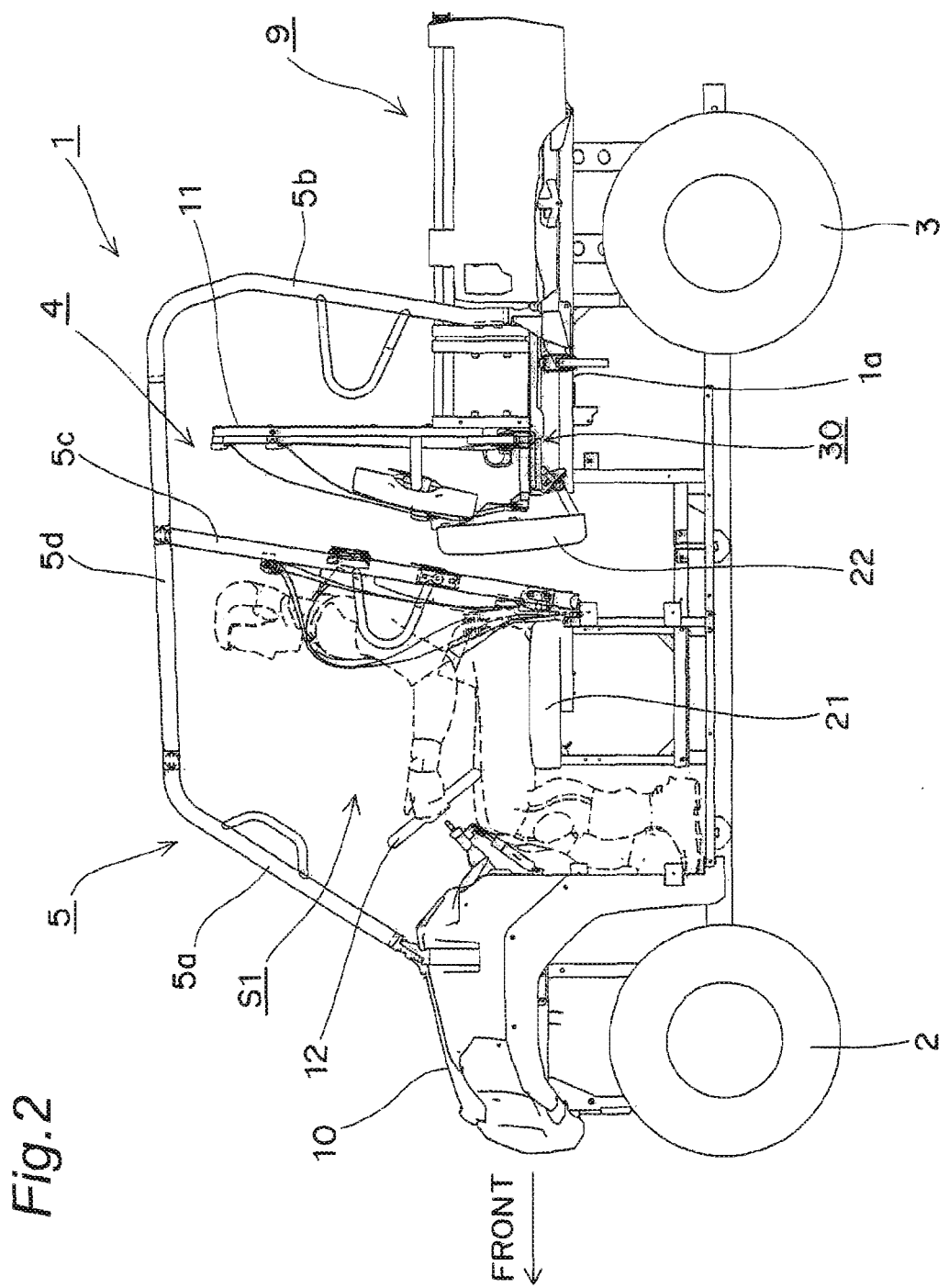
FIG. 2 is a left side view of the utility vehicle of FIG. 1 in which the cargo bed is in an expanded state.

FIG. 1 is a left side view of a utility vehicle according to the present invention in a non-expanded state of a cargo bed, and FIG. 2 is a left side view of the utility vehicle of FIG. 1 in an expanded state of the cargo bed. It should be noted that in the following description, a concept of the direction used in the present embodiment matches with a concept of the direction seen from a driver of the utility vehicle.

1. Entire Structure of the Vehicle

As shown in FIGS. 1 and 2, a utility vehicle 1 is provided with a pair of left and right front wheels 2 in a front part of a vehicle body, a pair of left and right rear wheels 3 in a rear part of the vehicle body, and a riding space (cabin) 4 between the front wheels 2 and the rear wheels 3. The riding space 4 is surrounded by a ROPS 5. An expandable cargo bed 9 is provided behind the riding space 4, and a bonnet 10 is provided in front of the riding space 4. Further, a screen 11 for partitioning from the riding space 4 is provided in a front end of the cargo bed 9. A bench type front seat 21 is installed in a front half part of the riding space 4, and a bench type stowable rear seat 22 is installed in a rear half part of the riding space 4. A left seating area S1 of the front seat 21 is a driver seat, and an operation portion such as a steering wheel 12 is provided in front of the left seating area S1.

2. Configuration of the ROPS

The ROPS 5 is an abbreviation of a rollover protective structure serving as a part of a vehicle body frame and being provided with a pair of left and right front vertical members (side ROPS's) 5a, a pair of left and right rear vertical members (side ROPS's) 5b, a pair of left and right intermediate vertical members (side ROPS's) 5c arranged between the front vertical members 5a and the rear vertical members 5b, and a plurality of upper end beam members 5d for coupling upper ends of the vertical members 5a, 5b, 5c.

3. Configuration of the Cargo Bed, Rear Seat, and Screen

Figure 3:
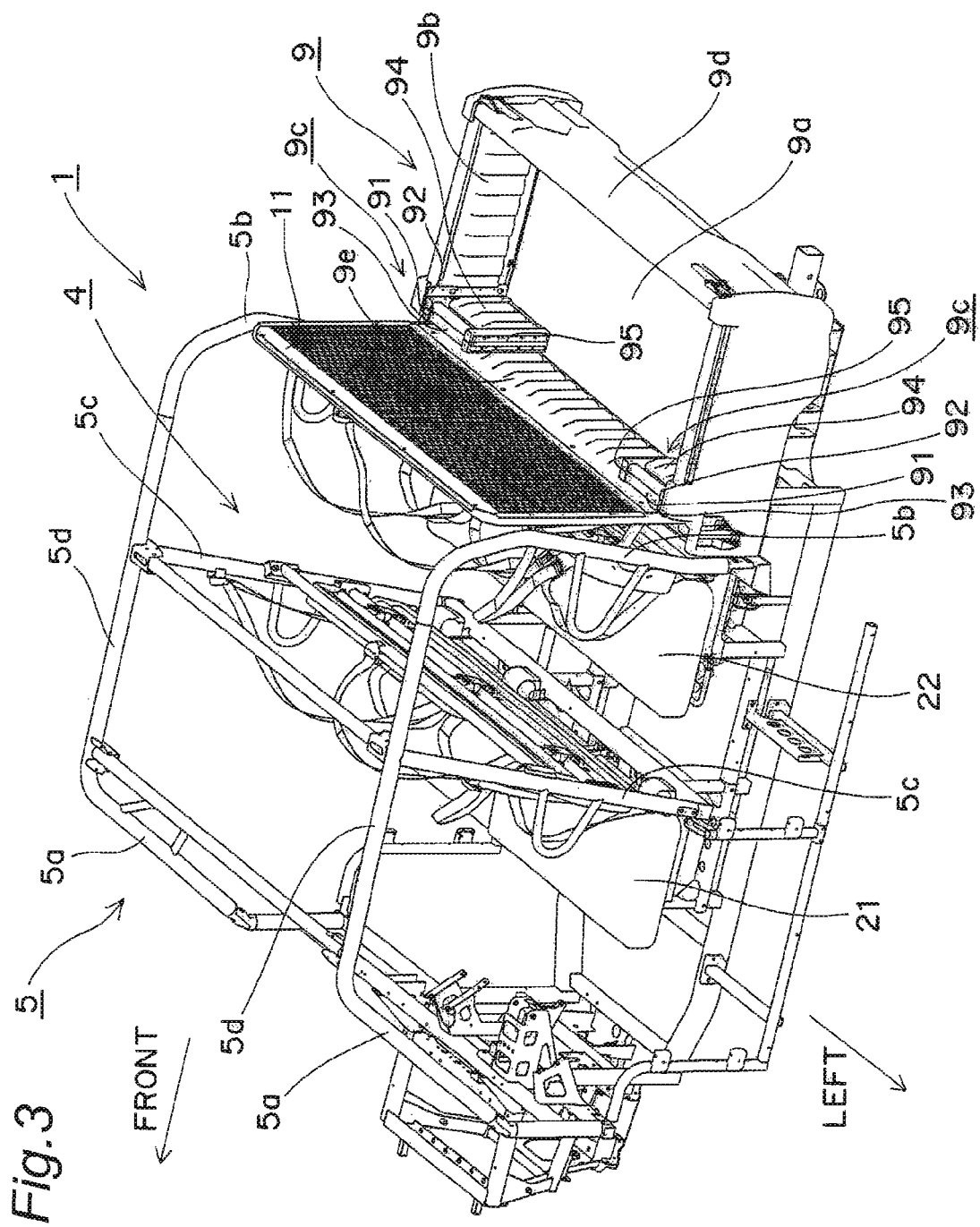
FIG. 3 is a rear perspective view of a part of the utility vehicle 1 of FIG. 1.
Figure 4:
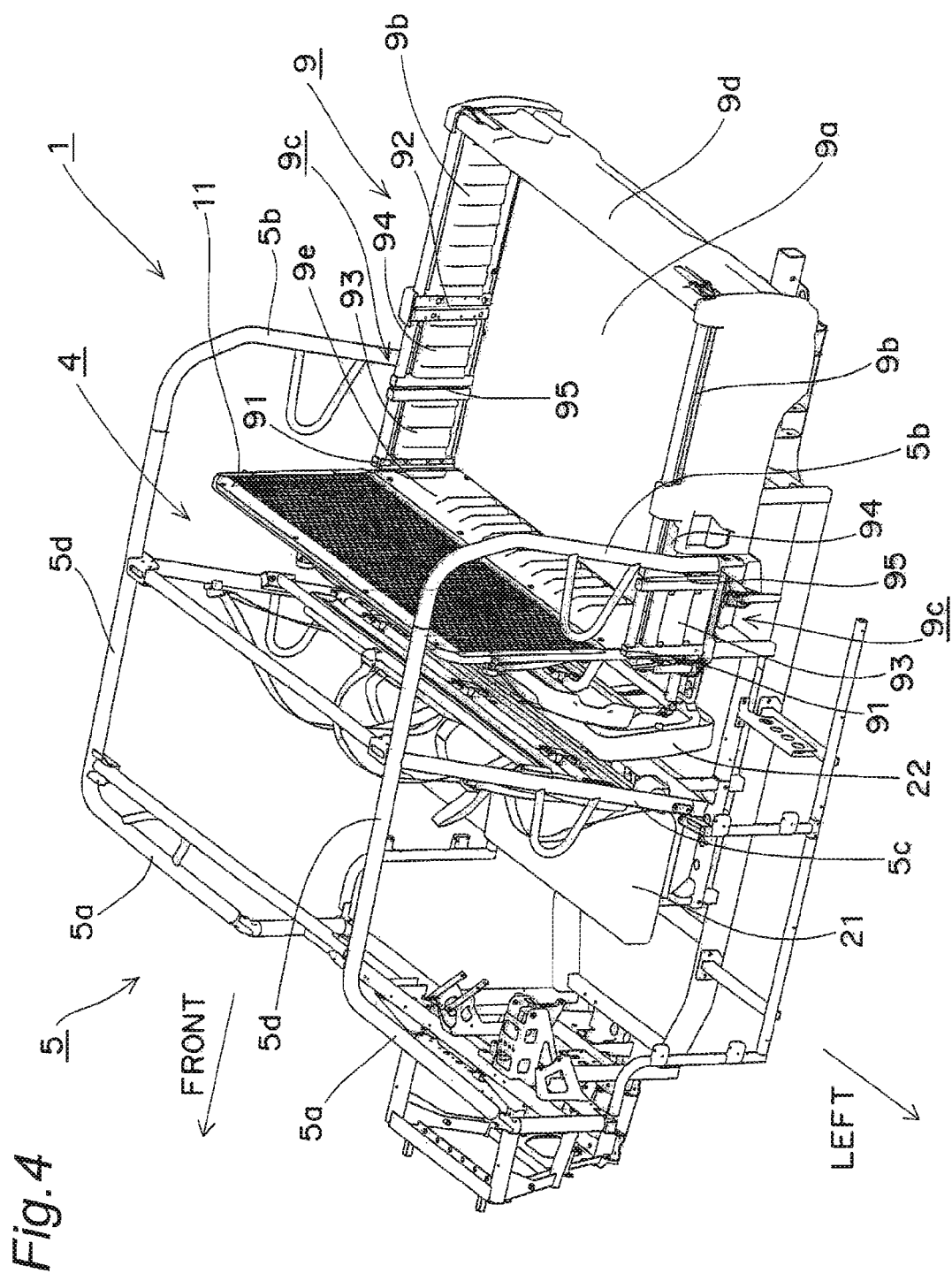
FIG. 4 is a rear perspective view of a part of the utility vehicle 1 of FIG. 2.

FIG. 3 is a rear perspective view of a part of the utility vehicle 1 of FIG. 1, and FIG. 4 is a rear perspective view of a part of the utility vehicle 1 of FIG. 2. As shown in FIGS. 1 and 3, at the time of the non-expanded state of the cargo bed 9, the stowable rear seat 22 is in a use state (a state that a passenger can be seated). As shown in FIGS. 2 and 4, at the time of the expanded state of the cargo bed 9, the rear seat 22 is folded and stowed behind the front seat 21.

As shown in FIGS. 3 and 4, the cargo bed 9 is provided with a bottom wall 9a, left and right fixed side walls 9b, left and right expansion side walls 9c, a rear wall 9d, and a front wall 9e. The left and right expansion side walls 9c are provided in front of the left and right fixed side walls 9b. The left and right expansion side walls 9c are coupled to the front wall 9e via front hinges 91 and also coupled to the left and right fixed side walls 9b via rear hinges 92. Further, in each of the left and right expansion side walls 9c, even numbers (two in the present embodiment) of plate members 93, 94 are coupled to each other via an intermediate hinge 95, so that the expansion side wall is foldable by the intermediate hinge 95. As shown in FIG. 3, by folding the left and right expansion side walls 9c, the cargo bed 9 is brought into the non-expanded state, and in this case, the rear seat 22 is in the use state (the state that the passenger can be seated). Meanwhile, as shown in FIG. 4, by extending the left and right expansion side walls 9c in a straight form, the cargo bed 9 is brought into the expanded state, and in this case, the rear seat 22 is folded and stowed behind the front seat 21.

Figure 5:
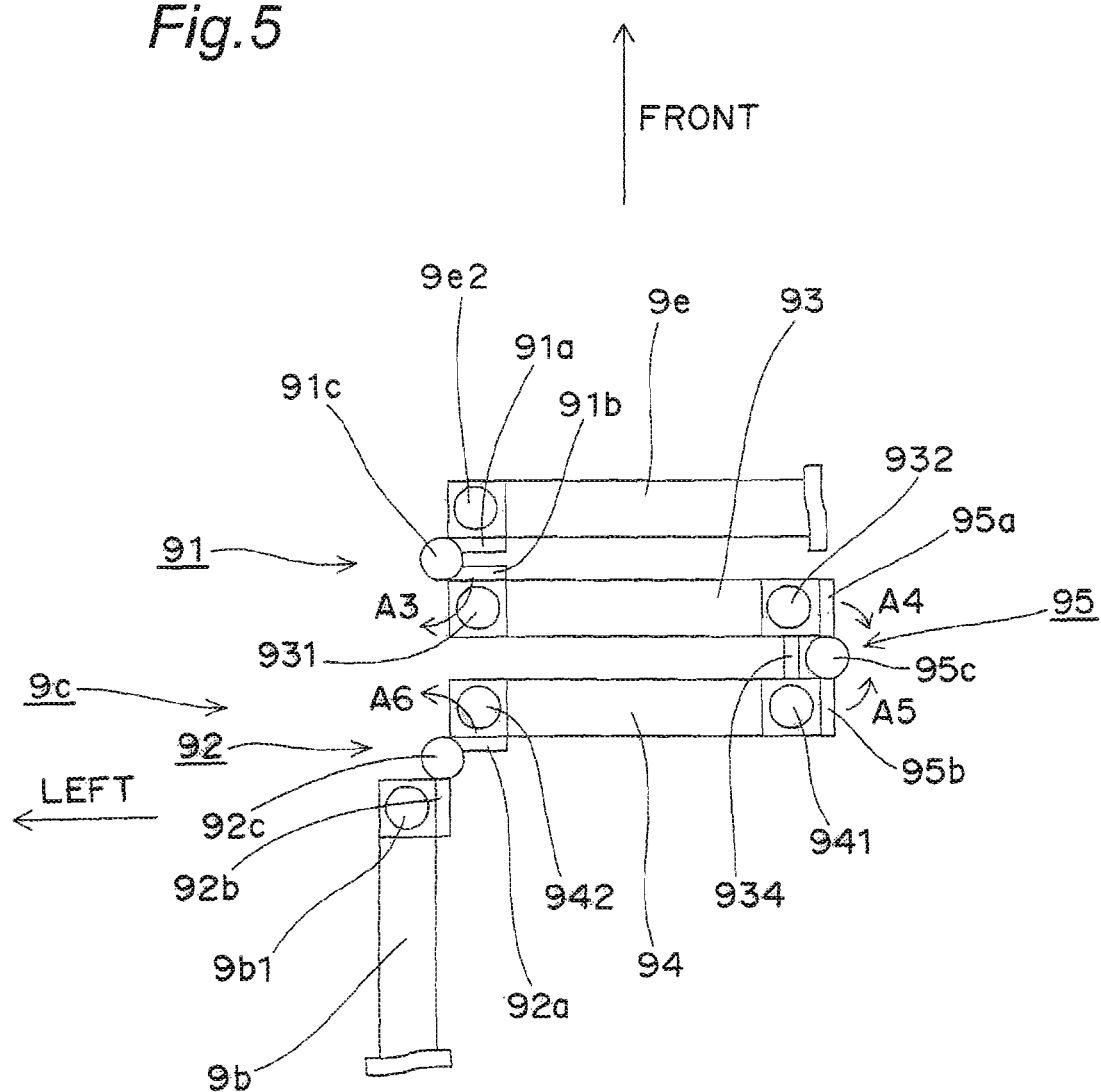
FIG. 5 is an enlarged top view of a left expansion side wall 9c in the non-expanded state.
Figure 6:
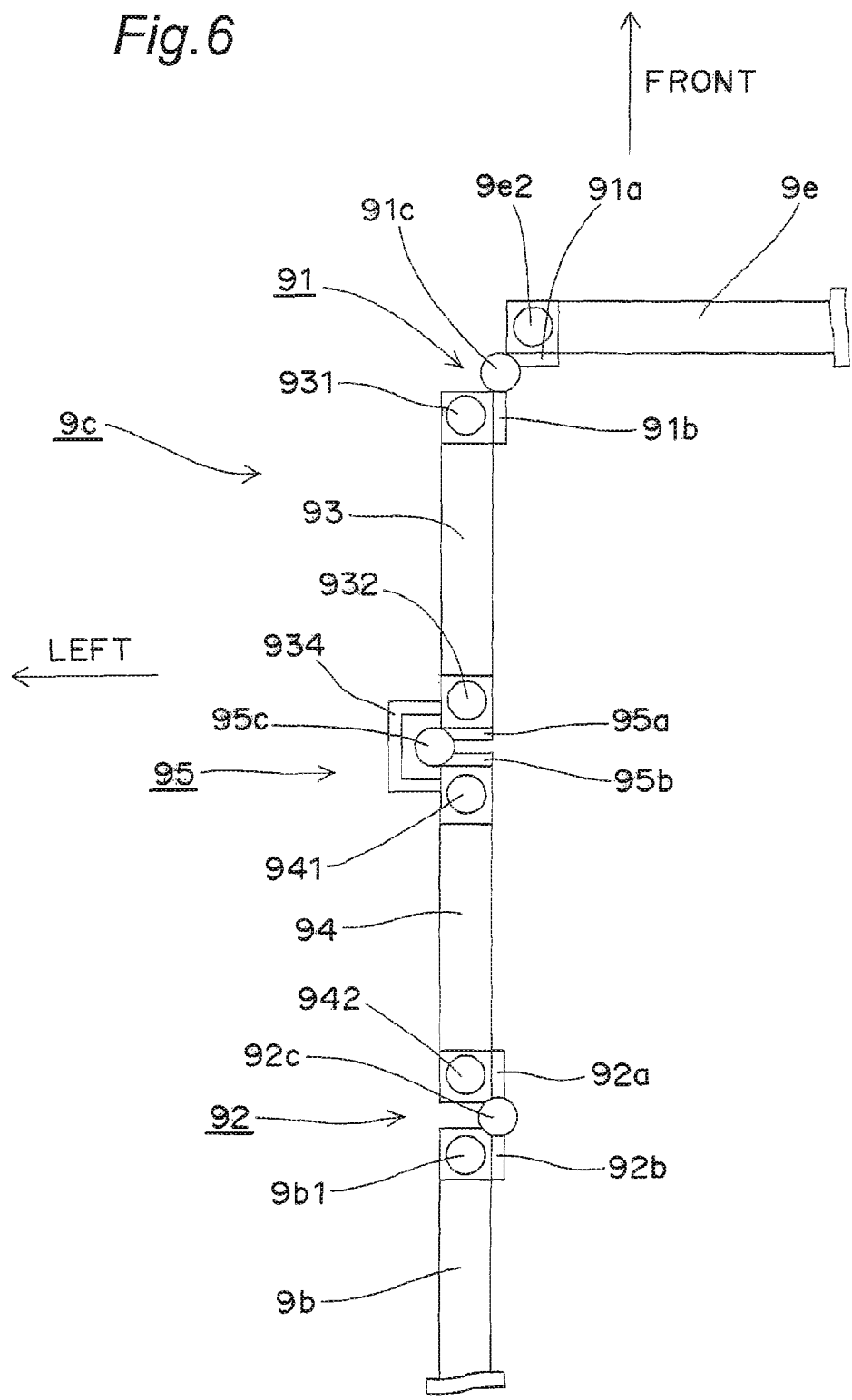
FIG. 6 is an enlarged top view of the left expansion side wall 9c in the expanded state.

FIG. 5 is an enlarged top view of the left expansion side wall 9c in the non-expanded state, and FIG. 6 is an enlarged top view of the left expansion side wall 9c in the expanded state. Hereinafter, with reference to FIGS. 5 and 6, a configuration of the expansion side wall 9c will be described in more detail.

As shown in FIG. 5, the front hinge 91 is provided with a hinge base 91a attached to a rear surface of the front wall 9e, a hinge base 91b attached to a front surface of the plate member 93, and a hinge shaft 91c. The base 91a and the base 91b are coupled to the shaft 91c so as to be pivotable on the shaft 91c. The rear hinge 92 is provided with a hinge base 92a attached to a rear surface of the plate member 94, a hinge base 92b attached to a right surface of the fixed side wall 9b, and a hinge shaft 92c. The base 92a and the base 92b are coupled to the shaft 92c so as to be pivotable on the shaft 92c. The intermediate hinge 95 is provided with a hinge base 95a attached to a right surface of the plate member 93, a hinge base 95b attached to a right surface of the plate member 94, and a hinge shaft 95c. The base 95a and the base 95b are coupled to the shaft 95c so as to be pivotable on the shaft 95c.

The expansion side wall 9c is displaced from a folded state of FIG. 5 to an expanded state of FIG. 6 as follows. Regarding the front hinge 91, the base 91b is pivoted on the shaft 91c by 90 degrees (in the arrow A3 direction). Regarding the intermediate hinge 95, the base 95a is pivoted on the shaft 95c by 90 degrees (in the arrow A4 direction) and the base 95b is pivoted on the shaft 95c by 90 degrees (in the arrow A5 direction). Regarding the rear hinge 92, the base 92a is pivoted on the shaft 92c by 90 degrees (in the arrow A6 direction). As a result, the plate member 93 extending in the vehicle width direction is displaced so as to extend in the front and rear direction behind the front wall 9e. The plate member 94 extending in the vehicle width direction is displaced so as to extend in the front and rear direction behind the plate member 93 extending in the front and rear direction and in front of the fixed side wall 9b. The plate members 93, 94 and the fixed side wall 9b are placed in line in the front and rear direction in this order. In the front hinge 91, an angle made by the base 91a and the base 91b can be fixed at two angles including 0 degrees in the folded state and 90 degrees in the extended state since the base 91a and the base 91b regulate each other. In a case where the angle made by the base 91a and the base 91b is 0 degrees, an open angle made by the front wall 9e and the plate member 93 taking the front hinge 91 as a vertex is 0 degrees. In a case where the angle made by the base 91a and the base 91b is 90 degrees, the open angle made by the front wall 9e and the plate member 93 taking the front hinge 91 as a vertex is 90 degrees. Similarly, in the rear hinge 92, an angle made by the base 92a and the base 92b can be fixed at two angles including 90 degrees in the folded state and 180 degrees in the extended state since the base 92a and the base 92b regulate each other. In a case where the angle made by the base 92a and the base 92b is 90 degrees, an open angle made by the plate member 94 and the fixed side wall 9b taking the rear hinge 92 as a vertex is 90 degrees. In a case where the angle made by the base 92a and the base 92b is 180 degrees, the open angle made by the plate member 94 and the fixed side wall 9b taking the rear hinge 92 as a vertex is 180 degrees. In the intermediate hinge 95, an angle made by the base 95a and the base 95b can be fixed at two angles including 180 degrees in the folded state and 0 degrees in the extended state since the base 95a and the base 95b regulate each other. In a case where the angle made by the base 95a and the base 95b is 180 degrees, an open angle made by the plate member 93 and the plate member 94 taking the intermediate hinge 95 as a vertex is 0 degrees. In a case where the angle made by the base 95a and the base 95b is 0 degrees, the open angle made by the plate member 93 and the plate member 94 taking the intermediate hinge 95 as a vertex is 180 degrees.

The plate member 93 and the plate member 94 are coupled to each other by an elastic member 934. The elastic member 934 is formed by a plate spring for example. As shown in FIG. 6, the elastic member 934 biases so that the angle made by the base 95a and the base 95b is 0 degrees, that is, the plate member 93 and the plate member 94 are in line in the front and rear direction (the open angle made by the plate member 93 and the plate member 94 taking the intermediate hinge 95 as a vertex is 180 degrees). Therefore, as shown in FIG. 5, in a case where the angle made by the base 95a and the base 95b is 180 degrees in the folded state, the elastic member 934 is compressed.

Figure 7:
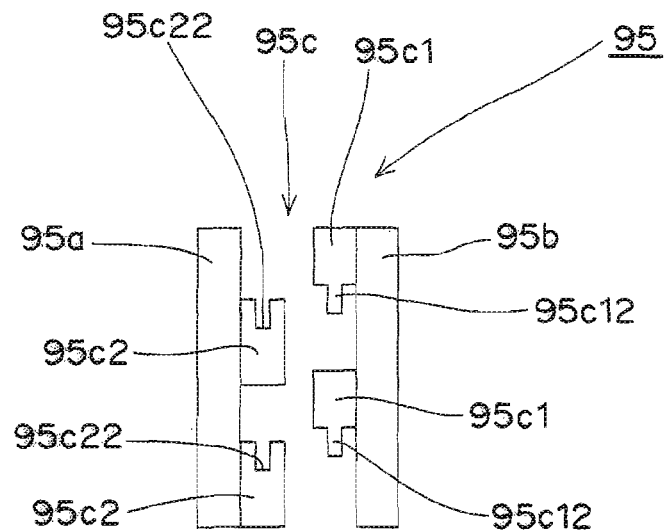
FIG. 7 is a schematic view showing one embodiment in which a front hinge 91, a rear hinge 92, and an intermediate hinge 95 can be fixed at two angles.

FIG. 7 is a schematic view showing an embodiment different from the above embodiment in which the front hinge 91, the rear hinge 92, and the intermediate hinge 95 can be fixed at two angles. In FIG. 7, the intermediate hinge 95 is taken as an example and described. As shown in FIG. 7, the shaft 95c can be separated into a convex member 95c1 and a concave member 95c2. When the angle made by the base 95a and the base 95b is set to specific two angles, a convex engagement portion 95c12 of the convex member 95c1 and a concave engagement portion 95c22 of the concave member 95c2 are engageable with each other. At the time of changing the angle made by the base 95a and the base 95b, firstly, the convex engagement portion 95c1 and the concave engagement portion 95c2 are separated, and the base 95a and the base 95b are pivoted on the shaft 95c. After the angle made by the base 95a and the base 95b is made to be 0 degrees or 180 degrees, the convex engagement portion 95c1 and the concave engagement portion 95c2 are engaged with each other. As a result, in the intermediate hinge 95, the angle made by the base 95a and the base 95b can be fixed at 0 degrees and 180 degrees.

Figure 8:
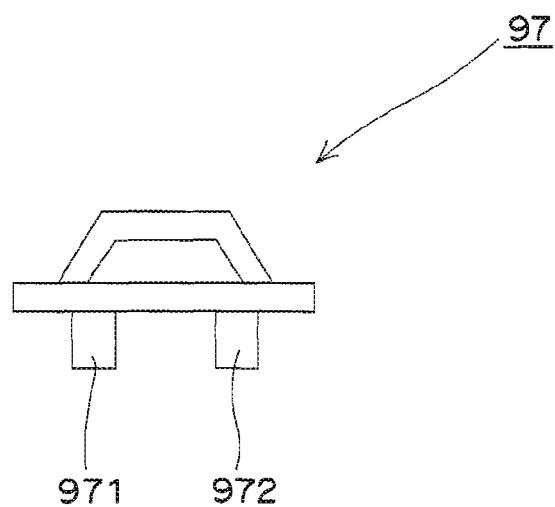
FIG. 8 is a schematic side view of a fixing member 97 for fixing the expansion side wall 9c in a folded state or an expanded state.

As shown in FIGS. 5 and 6, holes 9e2 are provided on upper surfaces of both ends of the front wall 9e, holes 931, 932 are provided on upper surfaces of both ends of the plate member 93, holes 941, 942 are provided on upper surfaces of both ends of the plate member 94, and a hole 9b1 is provided on an upper surface of a front end of the fixed side wall 9b. FIG. 8 is a schematic side view of a fixing member 97 for fixing the expansion side wall 9c in the folded state or the expanded state. By respectively inserting insertion portions 971, 972 of the fixing member 97 into the holes 932, 941, the plate member 93 and the plate member 94 can be fixed. Further, by respectively inserting insertion portions 971, 972 of fixing members 97 into two other pairs of adjacent holes (the hole 9e2 and the hole 931, and the hole 942 and the hole 9b1), the entire expansion side wall 9c can be fixed in the folded state or the extended state so as to prevent backlash of the expansion side wall 9c.

Figure 9:
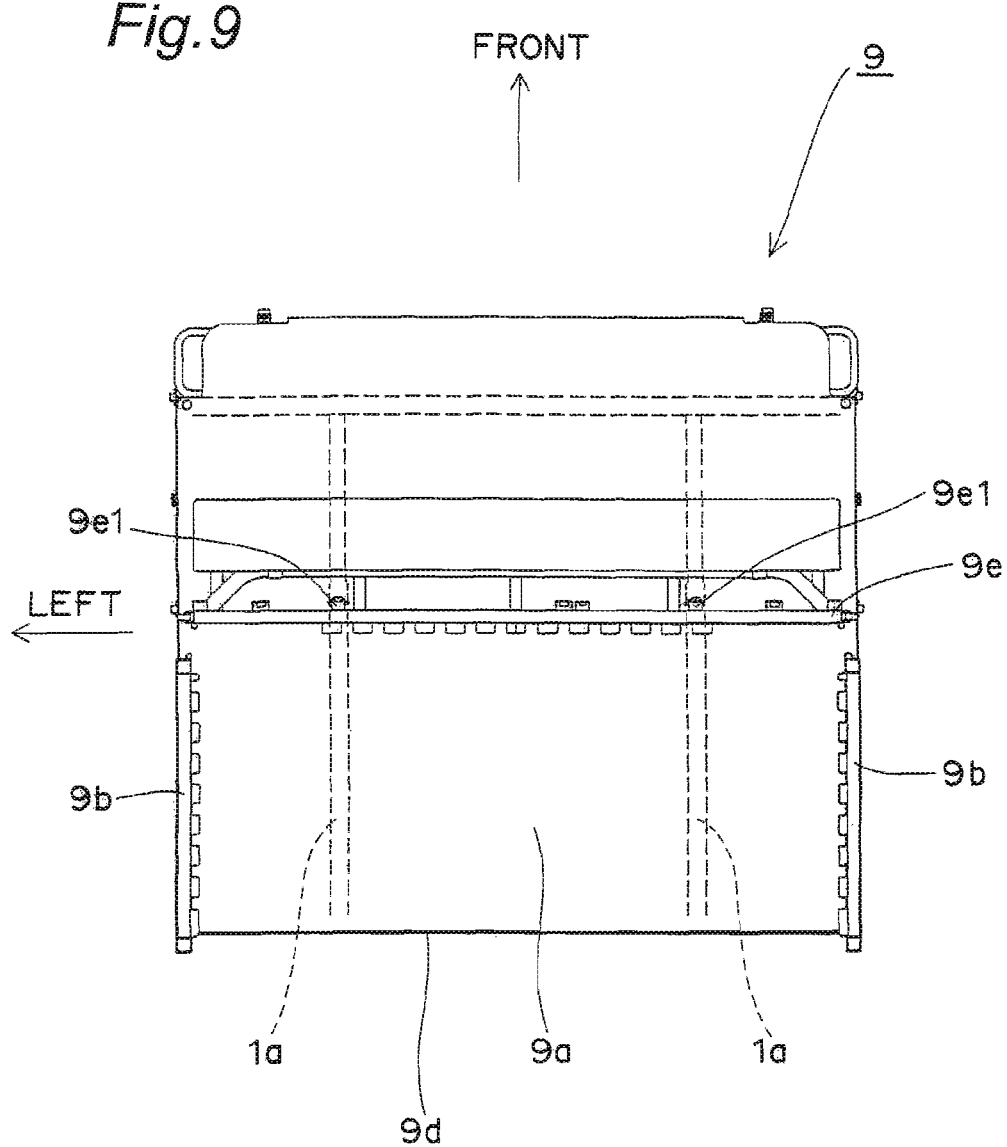
FIG. 9 is a top view of the cargo bed 9 in the non-expanded state.
Figure 10:
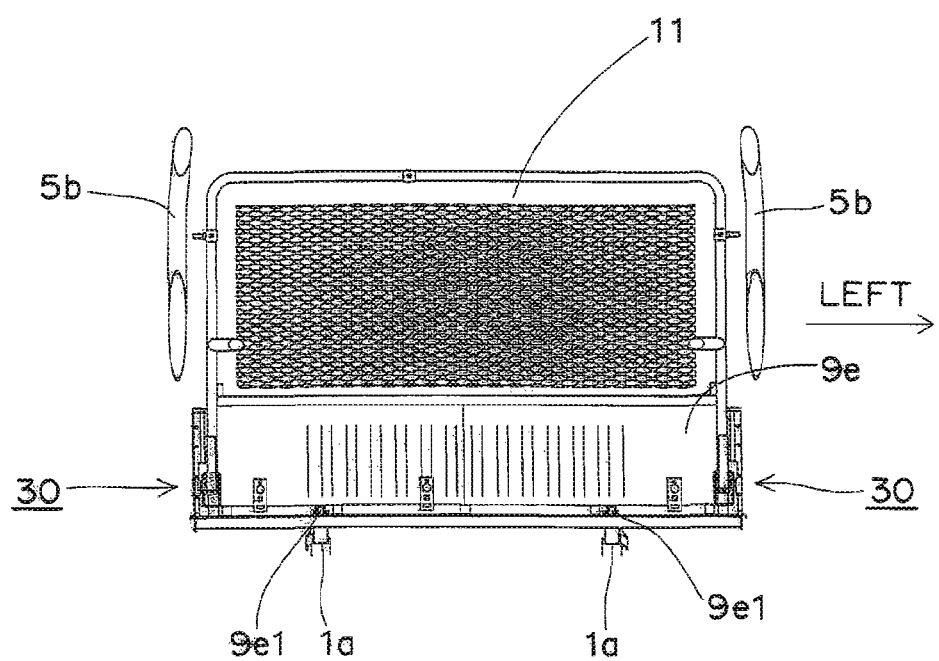
FIG. 10 is a front view of a front wall 9e and a screen 11.

FIG. 9 is a top view of the cargo bed 9 in the non-expanded state, and FIG. 10 is a front view of the front wall 9e and the screen 11. As shown in FIGS. 9 and 10, a plurality of rollers 9e1 is provided in a lower end of the front wall 9e of the cargo bed 9 so as to have a gap in the vehicle width direction. A cargo bed support frame 1a of the vehicle body for supporting the cargo bed 9 is provided on the lower side of the bottom wall 9a. When the cargo bed 9 is displaced between the non-expanded state and the expanded state, the front wall 9e is moved forward and rearward and at the time, the rollers 9e1 are moved forward and rearward on the upper side of the cargo bed support frame 1a.

Figure 11:
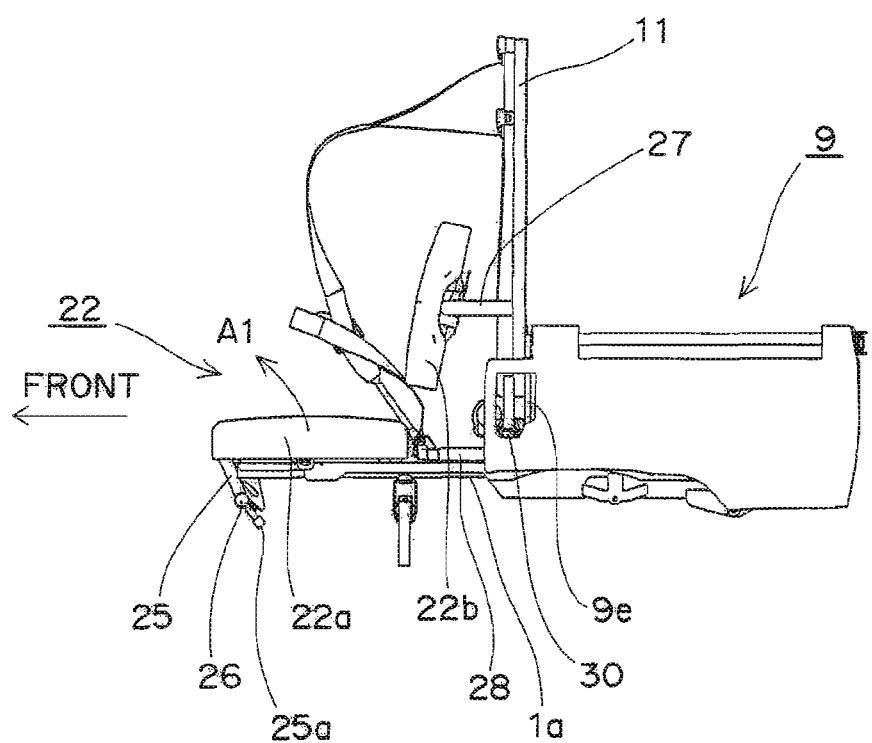
FIG. 11 is a left side view of a rear seat 22, the screen 11, and the cargo bed 9 in the non-expanded state of the cargo bed 9.
Figure 12:
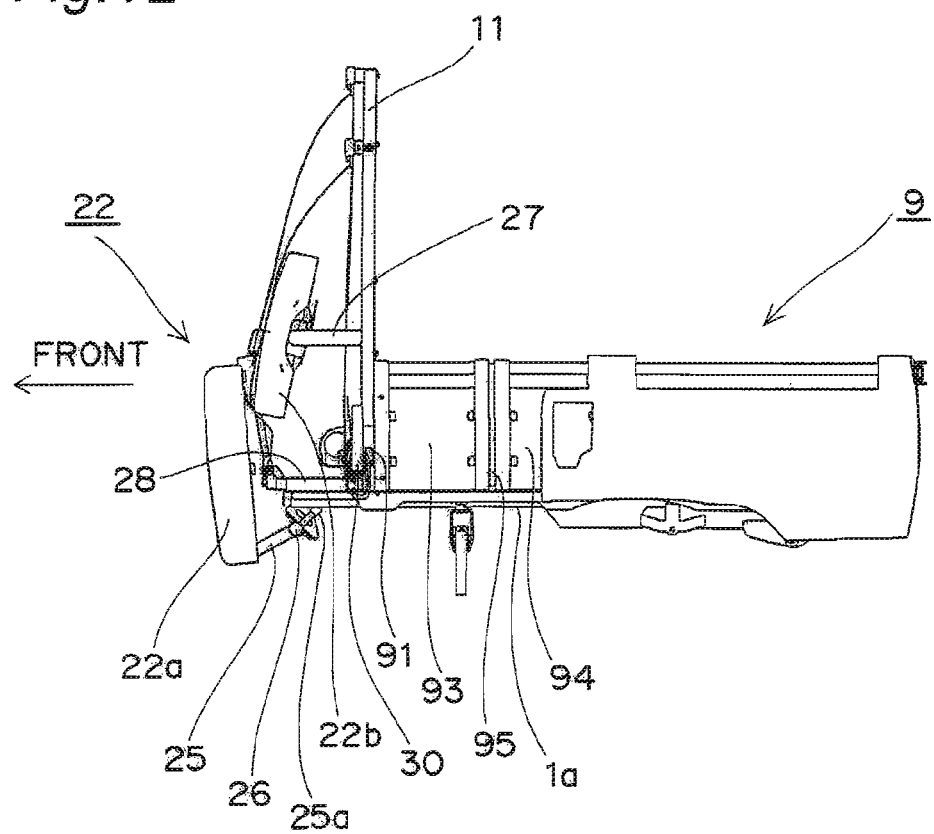
FIG. 12 is a left side view of the rear seat 22, the screen 11, and the cargo bed 9 in the expanded state of the cargo bed 9.

FIG. 11 is a left side view of the rear seat 22, the screen 11, and the cargo bed 9 in the non-expanded state of the cargo bed 9, and FIG. 12 is a left side view of the rear seat 22, the screen 11, and the cargo bed 9 in the expanded state of the cargo bed 9. In FIG. 11, the rear seat 22 is in the use state that the passenger can be seated while facing forward and in FIG. 12, the rear seat is in a stowed state that a seat bottom 22a is stowed on the front upper side. The specific stowed state will be described below. In FIG. 11, a front end of the seat bottom 22a of the rear seat 22 is pivotably supported on a front end of the cargo bed support frame 1a via an arm 25 and a hinge 26. A backrest 22b of the rear seat 22 is fixed to the screen 11 by an attachment pipe 27. The backrest 22b is movable in the front and rear direction together with the front wall 9e and the screen 11.

When the rear seat 22 is in the use state shown in FIG. 11, the seat bottom 22a is disposed on an upper surface of the front end of the cargo bed support frame 1a, and the backrest 22b is placed on the upper side in the vicinity of a rear end of the seat bottom 22a. Meanwhile, when the rear seat 22 is in the stowed state shown in FIG. 12, the seat bottom 22a is pivoted anticlockwise (in the arrow A1 direction of FIG. 11) on the hinge 26 and brought into a substantially vertical state at a position in the vicinity of the front end of the cargo bed support frame 1a. At this time, since a stopper 25a provided in the arm 25 of the seat bottom 22a is abutted with the cargo bed support frame 1a, the seat bottom 22a is maintained in a substantially vertical state. Meanwhile, the backrest 22b is moved forward together with the front wall 9e and the screen 11 and abutted with or brought close to a rear surface of an upper part of the seat bottom 22a.

In FIG. 11, the screen 11 is fixed to the front wall 9e of the cargo bed 9 as described above, and further, an L shape movable mount 28 whose lower piece protrudes forward when seen from the side is secured to a lower end of the screen 11. A plurality of rollers (not shown) is rotatably provided on a lower surface of the movable mount 28, and the movable mount is supported on the upper surface of the cargo bed support frame 1a via these rollers movably in the front and rear direction. Thereby, a position of the screen 11 can be changed integrally with the movable mount 28 and the front wall 9e between a first position at the time of expansion of the cargo bed (FIG. 12) and a second position at the time of non-expansion of the cargo bed on the rear side of the first position (FIG. 11). Lock devices 30 for respectively fixing the screen 11 and the front wall 9e to the cargo bed support frame 1a at the first position and at the second position are respectively provided in both left and right side parts of the lower end of the front wall 9e.

4. Configuration of the Lock Device

Figure 13:
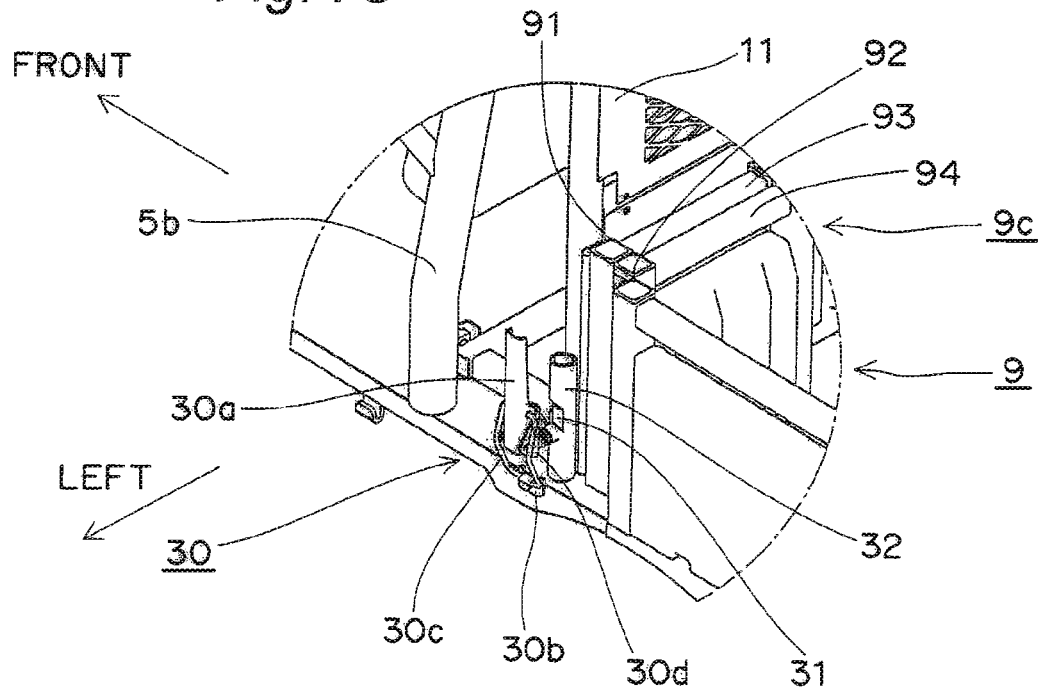
FIG. 13 is a perspective view showing a state of a lock device 30.
Figure 14:
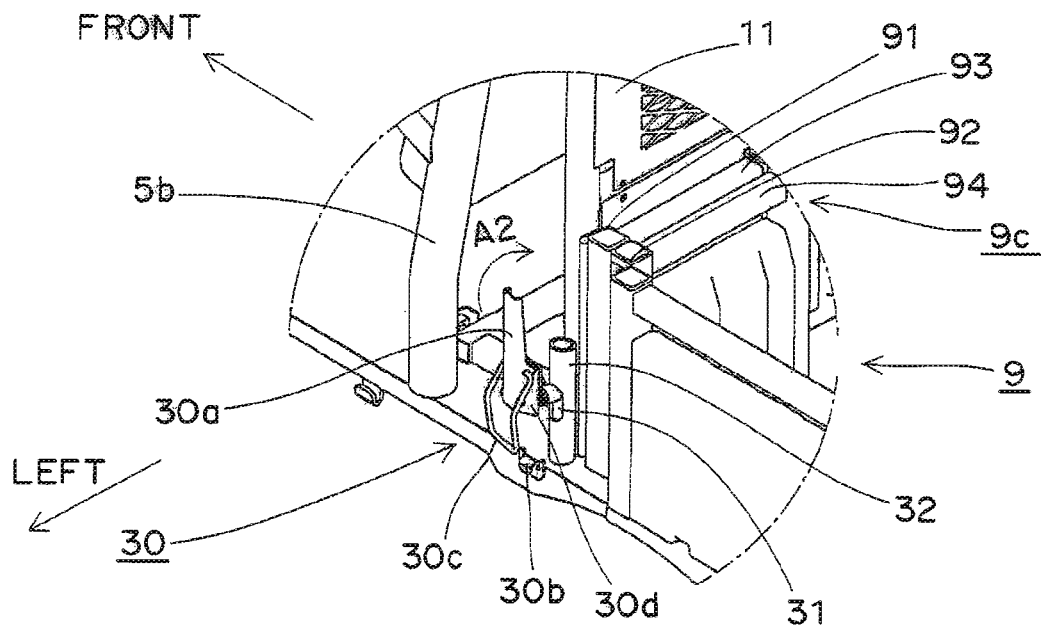
FIG. 14 is a perspective view showing another state of the lock device 30.
Figure 15:
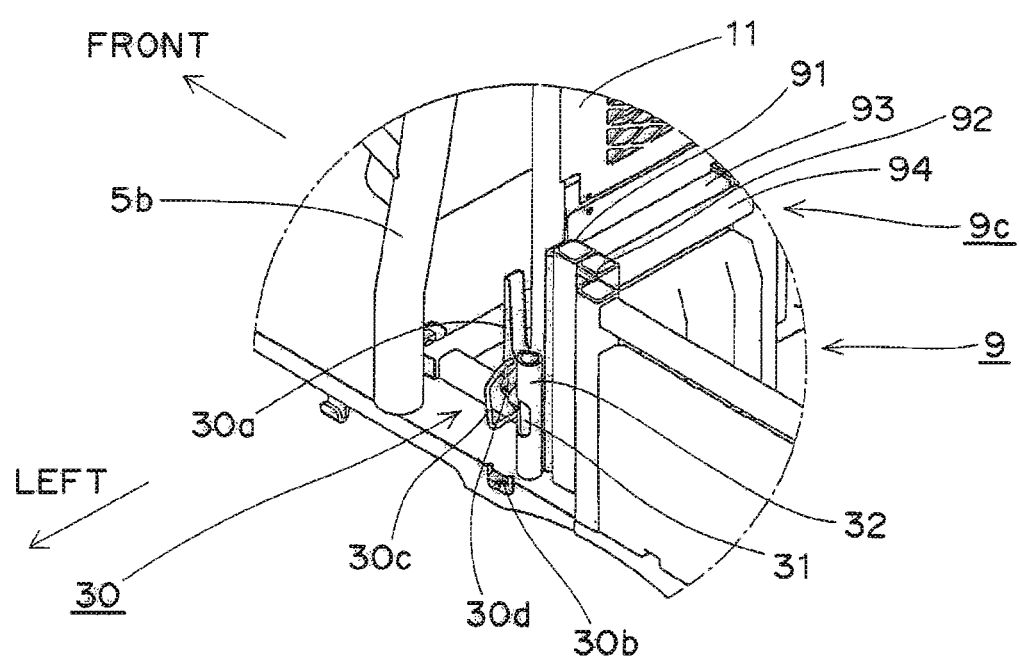
FIG. 15 is a perspective view showing the other state of the lock device 30.
Figure 16:
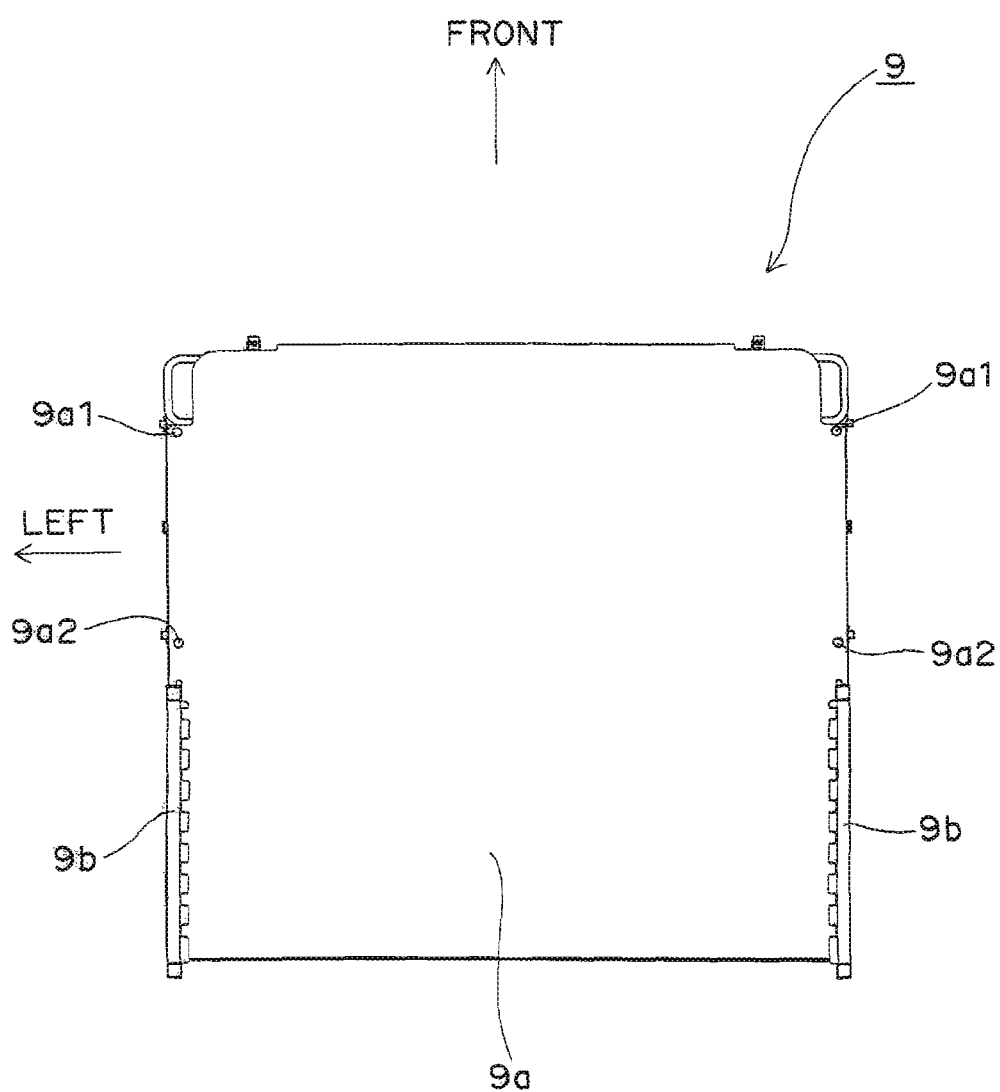
FIG. 16 is a top view of the cargo bed 9.
Figure 17:
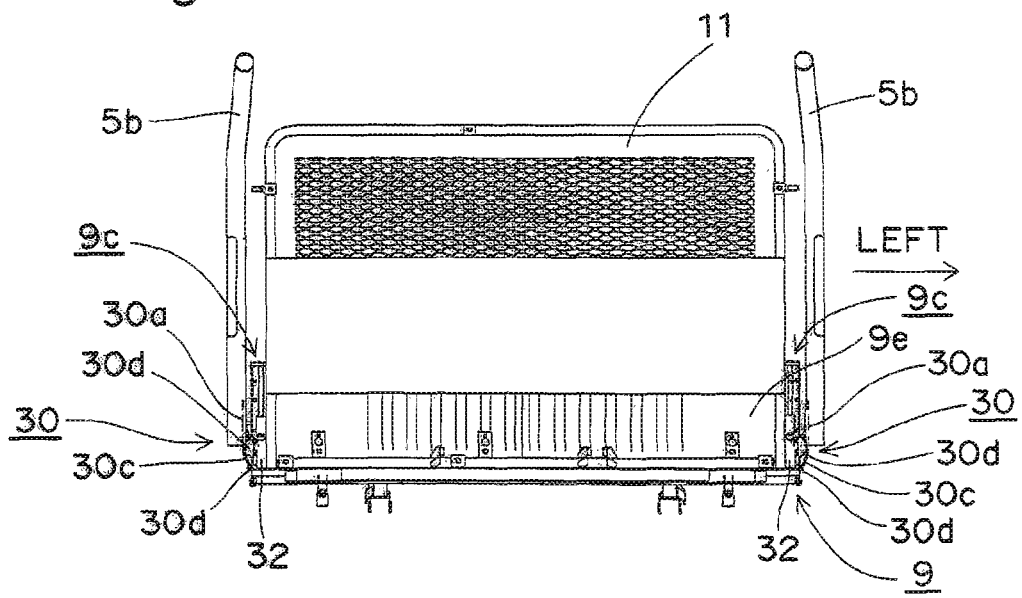
FIG. 17 is a front view of the lock devices 30 in the state of FIG. 13.
Figure 18:
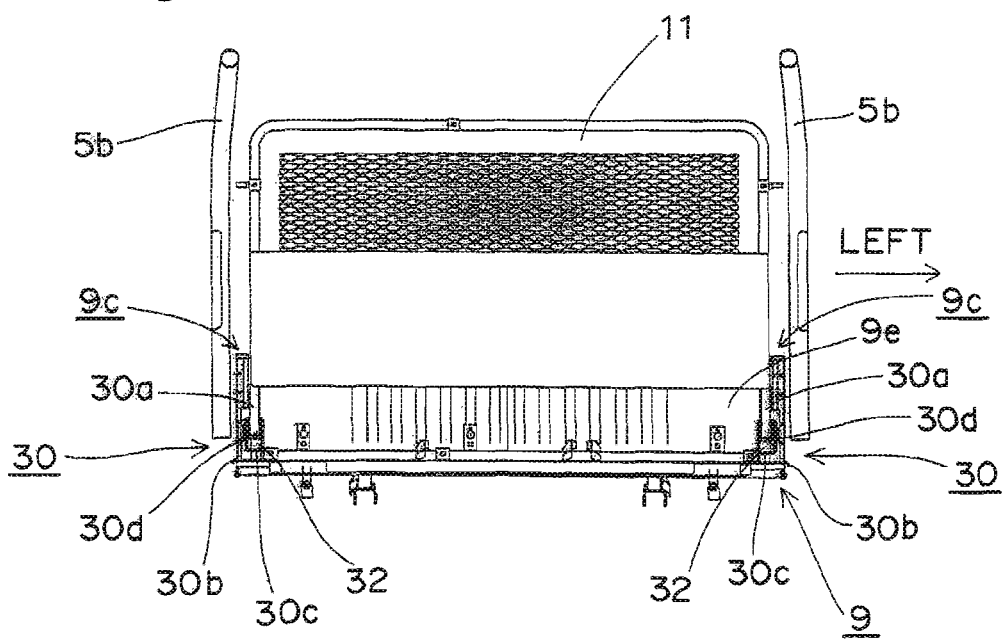
FIG. 18 is a front view of the lock devices 30 in the state of FIG. 15.
Figure 19:
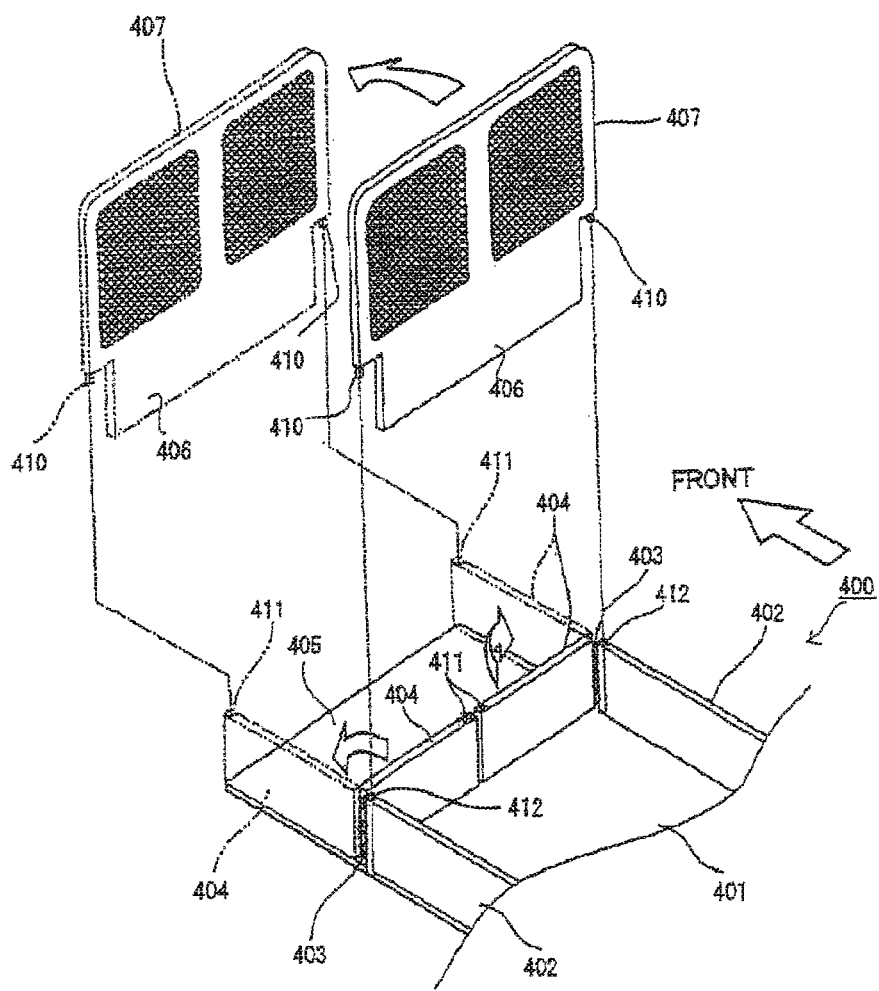
FIG. 19 is a perspective view of a conventional cargo bed and a conventional screen.

FIGS. 13 to 15 are perspective views showing states of the lock device 30, and FIG. 16 is a top view of the cargo bed 9. As shown in FIG. 13, each of the lock devices 30 is provided with a lever 30a, a ring 30c coupled to the middle of the lever 30a and caught on a hook 30b which is provided in the cargo bed support frame 1a, a holder 30d, and a substantially vertically positioning and pivot pin 31 as lock parts. The hook 30b is placed on the outer side in the vehicle width direction of the expansion side wall 9c in the expanded state and the non-expanded state, respectively. The lever 30a is pivotably supported by the holder 30d, and the holder 30d is secured to the pivot pin 31. The positioning pin 31 is fitted to a retaining pipe 32 secured to the lower end of the screen 11 movably in the up and down direction. As shown in FIG. 16, positioning holes 9a1 corresponding to the first position of the screen 11 and positioning holes 9a2 corresponding to the second position are formed in the bottom wall 9a of the cargo bed 9. By inserting the positioning pins 31 (FIG. 13) into the positioning holes 9a1, 9a2, the screen 11 (FIG. 11) and the front wall 9e (FIG. 11) are precisely locked at the first position and at the second position. FIG. 14 shows the lock device 30 in a state that the ring 30c is removed from the hook 30b. The lever 30a, the ring 30c, the holder 30d, and the positioning pin 31 are biased downward by an elastic body (not shown). As a result, even when the ring 30c is removed from the hook 30b as shown in FIG. 14, the lever 30a, the ring 30c, the holder 30d, and the positioning pin 31 are placed at a lowered position on the lower side. It should be noted that since the lever 30a, the ring 30c, the holder 30d, and the positioning pin 31 are coupled to each other, at least one of the lever 30a, the ring 30c, the holder 30d, and the positioning pin 31 is required to be biased downward. For example, only the positioning pin is required to be biased downward by the elastic body. The positioning pin 31 is pivotable on a positioning pin axis at a lifted position within a range of substantially 90 degrees. FIG. 15 shows the lock device 30 in a state that the positioning pin 31 is pivoted on the pin axis by substantially 90 degrees and the lever 30a, the ring 30c, and the holder 30d are placed on the front side. FIG. 17 is a front view of the lock devices 30 in the state of FIG. 13, and FIG. 18 is a front view of the lock devices 30 in the state of FIG. 15. As shown in FIG. 17, when the positioning pins 31 are inserted into the positioning holes 9a2 or the positioning holes 9a1 and the rings 30c are caught on the hooks 30b, so that the screen 11 and the front wall 9e are fixed, the levers 30a, the rings 30c, and the holders 30d are placed at a fixing position overlapping with the rear vertical members 5b of the ROPS 5 or on the inner side in the vehicle width direction of outer ends of the rear vertical members 5b and on the outer side in the vehicle width direction of the cargo bed 9. Meanwhile, as shown in FIG. 18, when the positioning pins 31 are taken out from the positioning holes 9a2, the rings 30c are removed from the hooks 30b, and the positioning pins 31 are pivoted, the levers 30a, the rings 30c, and the holders 30d are placed at a non-fixing position on the inner side in the vehicle width direction of the rear vertical members 5b of the ROPS 5 and on the inner side in the vehicle width direction of the cargo bed 9. The lock devices 30 are placed on the outer side in the vehicle width direction of the expansion side walls 9c at the fixing position.

Therefore, at the time of moving the screen 11 between the first position and the second position, from the state shown in FIGS. 13 and 17, the rings 30c are removed from the hooks 30b as shown in FIG. 14. As shown in FIG. 14, by moving the levers 30a, the rings 30c, the holders 30d, and the positioning pins 31 to the lifted position on the upper side and rotating the positioning pins 31 on the positioning pin axes by substantially 90 degrees (in the arrow A2 direction), the levers 30a, the rings 30c, and the holders 30d can be placed on the inner side in the vehicle width direction of the rear vertical members 5b of the ROPS 5 as shown in FIGS. 15 and 18. Thereby, the levers 30a, the rings 30c, and the holders 30d can be moved in the front and rear direction without contact with the rear vertical members 5b.

5. Operation of the Cargo Bed, Rear Seat, and Screen

Hereinafter, operations relating to stowing of the rear seat 22, expansion of the cargo bed 9, and forward movement of the screen 11 will be described.

As shown in FIG. 11, in the use state that the passenger can be seated on the rear seat 22, as a matter of course, the cargo bed 9 is in the non-expanded state, and the front wall 9e of the cargo bed 9, the screen 11, and the movable mount 28 are locked to the cargo bed support frame 1a at the second position by the left and right lock devices.

In a case where the cargo bed 9 is expanded from the state of FIG. 11, firstly, the rear seat 22 is stowed. That is, the seat bottom 22a of the rear seat 22 is pivoted front-upward (in the arrow A2 direction) on the hinge 26. As shown in FIG. 12, in a state that the seat bottom 22a is substantially vertical, the seat bottom is locked by the stopper 25a.

Next, in the lock devices 30 in the state of FIG. 13, the levers 30a are lowered and the rings 30c are removed from the hooks 30b for the second position. The levers 30a and the holders 30d are lifted and the positioning pins 31 are taken out from the positioning holes 9a2 for the second position. The positioning pins 31 are pivoted on the pivot pin axes by substantially 90 degrees (in the arrow A2 direction) at the lifted position. Thereby, the levers 30a, the rings 30c, and the holders 30d are placed on the inner side in the vehicle width direction of the rear vertical members 5b of the ROPS 5, so as to be moved forward on the inner side in the vehicle width direction of the rear vertical members 5b.

After that, the screen 11, the movable mount 28, and the front wall 9e are integrally moved forward. In a state that the screen 11 reaches the first position, the positioning pins 31 are pivoted on the pivot pin axes by 90 degrees (in the direction opposite to the arrow A2 direction). The levers 30a and the holders 30d are lowered together with the positioning pins 31 and the positioning pins 31 are inserted into the positioning holes 9a1 for the first position. Finally, by catching the rings 30c on the hooks 30b for the first position and bringing up the levers 30a, the screen 11 is locked at the first position.

It should be noted that operations relating to displacement of the rear seat 22 to the use state, contraction of the cargo bed 9, and rearward movement of the screen 11 are performed by performing reverse operations to the above operations.

According to the utility vehicle with the above configuration, the following effects can be obtained.

(1) The screen 11 is attached to the front wall 9e and the expansion side walls 9c are foldably attached to the front wall 9e and the fixed side walls 9b. Thus, by extending or folding the expansion side walls 9c in a task of expanding or contracting the cargo bed 9, the position of the screen 11 can be easily changed between an expansion position and a non-expansion position without bringing up the screen 11.

(2) The expansion side walls 9c are coupled to the front wall 9e via the front hinges 91 and coupled to the fixed side walls 9b via the rear hinges 92, and the plate members 93, 94 are coupled to each other via the intermediate hinges 95. Thus, a configuration of the foldable expansion side walls 9c can be readily achieved.

(3) In the expanded state and the non-expanded state, the open angle made by the front wall 9e and the plate member 93 taking the front hinge 91 as a vertex, the open angle made by the plate member 94 and the fixed side wall 9b taking the rear hinge 92 as a vertex, and the open angle made by the plate members 93, 94 taking the intermediate hinge 95 as a vertex are locked to be predetermined angles. Thus, the plate members 93, 94 can be fixed in the expanded state and the non-expanded state.

(4) The plate members 93, 94 are biased by the elastic member 934 so as to have the open angle of 180 degrees (so that the angle made by the base 95a and the base 95b is 0 degrees). Thus, the folded expansion side wall 9c is biased in the direction in which the expansion side wall is extended by the elastic member 934. Therefore, the expansion side wall 9c can be readily displaced from the folded state to the extended state by the elastic member 934.

(5) Since the plurality of rollers 9e1 is provided in the lower end of the front wall 9e, the front wall 9e can be readily moved forward and rearward. Since the front wall 9e is readily moved forward and rearward, the expansion side walls 9c can be readily extended or folded.

(6) The lock devices 30 for fixing the front wall 9e to the vehicle body at a position in the expanded state and at a position in the non-expanded state are provided on the left and right sides of the front wall 9e, and the lock devices 30 are displaceable between the fixing position where the lock devices 30 are placed on the outer side in the vehicle width direction of the cargo bed 9 for fixing the front wall 9e and the non-fixing position where the lock devices 30 are placed on the inner side in the vehicle width direction of the cargo bed 9. Thus, at the time of moving the front wall 9e forward and rearward, the contact between the rear vertical members 5b provided in side ends of the vehicle body and the lock devices 30 can be prevented by placing the lock devices 30 at the non-fixing position. At the time of fixing the front wall 9e, the front wall 9e can be readily fixed to the side ends of the vehicle body by placing the lock devices 30 at the fixing position. As a result, forward and rearward movement of the front wall 9e of the cargo bed 9 in accordance with expansion and contraction tasks of the cargo bed 9 can be smoothly performed.

(7) The hooks 30b to be engaged with the lock devices 30 in the expanded state and the non-expanded state are respectively provided in the vehicle body, and the hooks 30b are placed on the outer side in the vehicle width direction of the expansion side walls 9c in the expanded state and the non-expanded state. Thus, displacement of the expansion side walls 9c to the outer side in the vehicle width direction can be suppressed by the hooks 30b.

(8) In the expanded state, the lock devices 30 are placed on the outer side in the vehicle width direction of the expansion side walls 9c at the fixing position. Thus, the displacement of the expansion side walls 9c to the outer side in the vehicle width direction can be suppressed by the lock devices 30.

(9) By attaching the fixing member 97 for fixing the plate members 93, 94 to each other, the plate members 93, 94 can be fixed so as not to be displaced to the inner side or the outer side in the vehicle width direction.

(10) The positioning holes 9a1 corresponding to the first position of the screen 11 and the positioning holes 9a2 corresponding to the second position are formed in the bottom wall 9a of the cargo bed 9. By inserting the positioning pins 31 into the positioning holes 9a1, 9a2, the screen 11 and the front wall 9e are precisely locked at the first position and at the second position. Therefore, the screen 11 and the front wall 9e can be reliably positioned, and the front wall 9e can be readily fixed by the lock devices 30.

(11) The levers 30a, the rings 30c, the holders 30d, and the positioning pins 31 of the lock devices 30 are biased downward by the elastic bodies. Thus, even in a case where the lock devices 30 do not fix the front wall 9e, the levers 30a, the rings 30c, the holders 30d, and the positioning pins 31 are placed at the lowered position on the lower side. As a result, the front wall 9e can be readily fixed.

(12) The levers 30a and the rings 30c of the lock devices 30 are pivoted by substantially 90 degrees between the fixing position and the non-fixing position. Thus, the lock devices 30 can be readily displaced between a position on the outer side in the vehicle width direction serving as the fixing position and a position on the inner side in the vehicle width direction serving as the non-fixing position.

(13) The seat bottom 22a of the rear seat 22 is stowed in a substantially vertical state in the expanded state. Thus, a stowing space of the seat bottom 22a can be reduced in the front and rear direction.

(14) Since the backrest 22b of the rear seat 22 is attached to the screen 11, the backrest 22b is automatically moved forward and rearward by moving the screen 11 forward and rearward. Thus, a position change of the screen 11 in accordance with the expansion and the contraction of the cargo bed 9 can be readily performed.

In the above embodiment, in the expanded state and the non-expanded state, the open angle made by the front wall 9e and the plate member 93 taking the front hinge 91 as a vertex, the open angle made by the plate member 94 and the fixed side wall 9b taking the rear hinge 92 as a vertex, and the open angle made by the plate members 93, 94 taking the intermediate hinge 95 as a vertex are locked to be predetermined angles. However, in order to fix the plate members 93, 94, at least one of the angles including the open angle made by the front wall 9e and the plate member 93 taking the front hinge 91 as a vertex, the open angle made by the plate member 94 and the fixed side wall 9b taking the rear hinge 92 as a vertex, and the open angle made by the plate members 93, 94 taking the intermediate hinge 95 as a vertex is required to be locked to be predetermined angles.

In the above embodiment, the two plate members are provided on each of the left and right sides. However, the number of the plate members is not limited to two but any even numbers of the plate members may be provided on each of the left and right sides.

In the above embodiment, the front seat 21 and the rear seat 22 are formed into a bench type. However, the seats may be formed into a box type.

Various modifications and changes can be made without departing from the spirit and the scope of the present invention described in the claims.

The invention claimed is:

1. A utility vehicle, comprising:
a front seat;
a rear seat at a rear side of the front seat;
a cargo bed at a rear side of the rear seat; and
a screen for partitioning the cargo bed and a riding space at a front side of the cargo bed;
wherein the cargo bed includes left and right fixed side walls, a front wall movable into the riding space, and left and right expansion side walls expandable into the riding space, the cargo bed is changeable between an expanded state in which the cargo bed is expanded forward into the riding space and a non-expanded state in which the cargo bed is not expanded into the riding space,
wherein the screen is attached to the front wall,
wherein the left expansion side wall is foldably attached to the front wall and the left fixed side wall, and the right expansion side wall is foldably attached to the front wall and the right fixed side wall,
wherein a front end of the left expansion side wall is coupled to the front wall via a first left hinge and a rear end of the left expansion side wall is coupled to the left fixed side wall via a second left hinge, and the left expansion side wall comprises a plurality of plate members coupled to each other via a third left hinge,
wherein a front end of the right expansion side wall is coupled to the front wall via a first right hinge and a rear end of the right expansion side wall is coupled to the right fixed side wall via a second right hinge, and the right expansion side wall comprises a plurality of plate members coupled to each other via a third right hinge,
wherein the first left hinge comprises a first hinge base and a second hinge base configured to regulate each other such that an angle between the first hinge base of the first left hinge and the second hinge base of the first left hinge can be fixed at a first degree and at a second degree,
wherein the second left hinge comprises a first hinge base and a second hinge base configured to regulate each other such that an angle between the first hinge base of the second left hinge and the second hinge base of the second left hinge can be fixed at a first degree and at a second degree,
wherein the third left hinge comprises a first hinge base and a second hinge base configured to regulate each other such that an angle between the first hinge base of the third left hinge and the second hinge base of the third left hinge can be fixed at a first degree and at a second degree,
wherein the first right hinge comprises a first hinge base and a second hinge base configured to regulate each other such that an angle between the first hinge base of the first right hinge and the second hinge base of the first right hinge can be fixed at a first degree and at a second degree,
wherein the second right hinge comprises a first hinge base and a second hinge base configured to regulate each other such that an angle between the first hinge base of the second right hinge and the second hinge base of the second right hinge can be fixed at a first degree and at a second degree, and
wherein the third right hinge comprises a first hinge base and a second hinge base configured to regulate each other such that an angle between the first hinge base of the third right hinge and the second hinge base of the third right hinge can be fixed at a first degree and at a second degree.

2. The utility vehicle according to claim 1, wherein, in each of the left and right expansion side walls, the plate members are coupled to each other by an elastic member so as to be biased in such a manner that an open angle between the plate members is a predetermined open angle.

3. The utility vehicle according to claim 1, wherein a plurality of rollers is provided in a lower end of the front wall.

4. The utility vehicle according to claim 1, comprising:
lock devices provided on left and right sides of the front wall, respectively, each of the lock devices being configured to fix the front wall to a vehicle body at a position in the expanded state and at a position in the non-expanded state, wherein each of the lock devices is configured to move between a fixing position where the lock device is at one of left and right outer sides of the vehicle body for fixing the front wall, and a non-fixing position where the lock device is at an inner side of the vehicle body, the inner side being closer to a longitudinal center axis of the utility vehicle than the outer side.

5. The utility vehicle according to claim 4, comprising:
left hooks provided on the left outer side of the vehicle body, the left hooks being configured to engage with the lock device at the left outer side of the vehicle body in the expanded state and the non-expanded state,
wherein the left hooks are spaced apart on the left outer side of the vehicle body along a first line parallel to the longitudinal center axis of the utility vehicle; and
right hooks provided on the right outer side of the vehicle body, the right hooks being configured to engage with the lock device at the right outer side of the vehicle body in the expanded state and the non-expanded state,
wherein the right hooks are spaced apart on the right outer side of the vehicle body along a second line parallel to the longitudinal center axis of the utility vehicle.

6. The utility vehicle according to claim 4,
wherein each of the lock devices has two fixing positions on a corresponding one of the left and right outer sides of the vehicle body, one of the fixing positions for the expanded state and the other one of the fixing positions for the non-expanded state.

7. The utility vehicle according to claim 1, comprising:
a fixing member for fixing the plate members of the left expansion side wall, and a fixing member for fixing the plate members of the right expansion side wall.

8. The utility vehicle according to claim 1,
wherein, for each of the left and right expansion side walls, said plurality of plate members is constituted by an even number of plate members.

9. The utility vehicle according to claim 1,
wherein the plate members of the left expansion side wall are foldably attached to each other, and
wherein the plate members of the right expansion side wall are foldably attached to each other.

10. The utility vehicle according to claim 1,
wherein the third left hinge is located in between the plate members of the left expansion side wall, and
wherein the third right hinge is located in between the plate members of the right expansion side wall.

11. The utility vehicle according to claim 1,
wherein, in the non-expanded state:
the plate members of the left expansion side wall are parallel to each other, and
the plate members of the right expansion side wall are parallel to each other.

12. The utility vehicle according to claim 11,
wherein, in the non-expanded state:
the plate members of the left expansion side wall are parallel to the front wall, and
the plate members of the right expansion side wall are parallel to the front wall.

13. The utility vehicle according to claim 1,
wherein, in the expanded state:
the left expansion side wall and the left fixed side wall are collinear, and
the right expansion side wall and the right fixed side wall are collinear.

14. The utility vehicle according to claim 13,
wherein, in the expanded state:
the plate members of the left expansion side wall are collinear, and
the plate members of the right expansion side wall are collinear.

15. The utility vehicle according to claim 1,
wherein the left expansion side wall is pivotably attached to the front wall by the first left hinge, and the right expansion side wall is pivotably attached to the front wall by the first right hinge.

16. The utility vehicle according to claim 1,
wherein, in the non-expanded state:
the front wall is disposed between the rear seat and the left and right expansion side walls.

17. The utility vehicle according to claim 1,
wherein, in the expanded state:
the front wall is closer than the left and right expansion side walls to the rear seat.

18. The utility vehicle according to claim 1,
wherein the left and right expansion side walls are attached to the front wall in both the expanded state and the non-expanded state.

19. A utility vehicle, comprising:
a front seat;
a rear seat at a rear side of the front seat;
a cargo bed at a rear side of the rear seat; and
a screen for partitioning the cargo bed and a riding space at a front side of the cargo bed;
wherein the cargo bed includes left and right fixed side walls, a front wall movable into the riding space, and left and right expansion side walls expandable into the riding space, the cargo bed is changeable between an expanded state in which the cargo bed is expanded forward into the riding space and a non-expanded state in which the cargo bed is not expanded into the riding space,
wherein the screen is attached to the front wall,
wherein the left expansion side wall is foldably attached to the front wall and the left fixed side wall, and the right expansion side wall is foldably attached to the front wall and the right fixed side wall,
wherein a front end of the left expansion side wall is coupled to the front wall via a first left hinge and a rear end of the left expansion side wall is coupled to the left fixed side wall via a second left hinge, and the left expansion side wall comprises a plurality of the plate members coupled to each other via a third left hinge,
wherein a front end of the right expansion side wall is coupled to the front wall via a first right hinge and a rear end of the right expansion side wall is coupled to the right fixed side wall via a second right hinge, and the right expansion side wall comprises a plurality of plate members coupled to each other via a third right hinge,
wherein the first left hinge comprises a hinge shaft, a first hinge base, and a second hinge base, the hinge shaft of the first left hinge being configured to be separable into a convex member and a concave member such that an angle between the first hinge base of the first left hinge and the second hinge base of the first left hinge can be fixed at a first degree and at a second degree by changing an engagement between the convex member of the first left hinge and the concave member of the first left hinge,
wherein the second left hinge comprises a hinge shaft, a first hinge base, and a second hinge base, the hinge shaft of the second left hinge being configured to be separable into a convex member and a concave member such that an angle between the first hinge base of the second left hinge and the second hinge base of the second left hinge can be fixed at a first degree and at a second degree by changing an engagement between the convex member of the second left hinge and the concave member of the second left hinge, wherein the third left hinge comprises a hinge shaft, a first hinge base, and a second hinge base, the hinge shaft of the third left hinge being configured to be separable into a convex member and a concave member such that an angle between the first hinge base of the third left hinge and the second hinge base of the third left hinge can be fixed at a first degree and at a second degree by changing an engagement between the convex member of the third left hinge and the concave member of the third left hinge, wherein the first right hinge comprises a hinge shaft, a first hinge base, and a second hinge base, the hinge shaft of the first right hinge being configured to be separable into a convex member and a concave member such that an angle between the first hinge base of the first right hinge and the second hinge base of the first right hinge can be fixed at a first degree and at a second degree by changing an engagement between the convex member of the first right hinge and the concave member of the first right hinge, wherein the second right hinge comprises a hinge shaft, a first hinge base, and a second hinge base, the hinge shaft of the second right hinge being configured to be separable into a convex member and a concave member such that an angle between the first hinge base of the second right hinge and the second hinge base of the second right hinge can be fixed at a first degree and at a second degree by changing an engagement between the convex member of the second right hinge and the concave member of the second right hinge, and wherein the third right hinge comprises a hinge shaft, a first hinge base, and a second hinge base, the hinge shaft of the third right hinge being configured to be separable into a convex member and a concave member such that an angle between the first hinge base of the third right hinge and the second hinge base of the third right hinge can be fixed at a first degree and at a second degree by changing an engagement between the convex member of the third right hinge and the concave member of the third hinge.

20. The utility vehicle according to claim 1, wherein the first hinge base of the first left hinge, the second hinge base of the first left hinge, the first hinge base of the second left hinge, the second hinge base of the second left hinge, the first hinge base of the third left hinge, the second hinge base of the third left hinge, the first hinge base of the first right hinge, the second hinge base of the first right hinge, the first hinge base of the second right hinge, the second hinge base of the second right hinge, the first hinge base of the third right hinge, and the second hinge base of the third right hinge are plate-shaped.

* * * * *